United States Patent Office 2,853,773
Patented Sept. 30, 1958

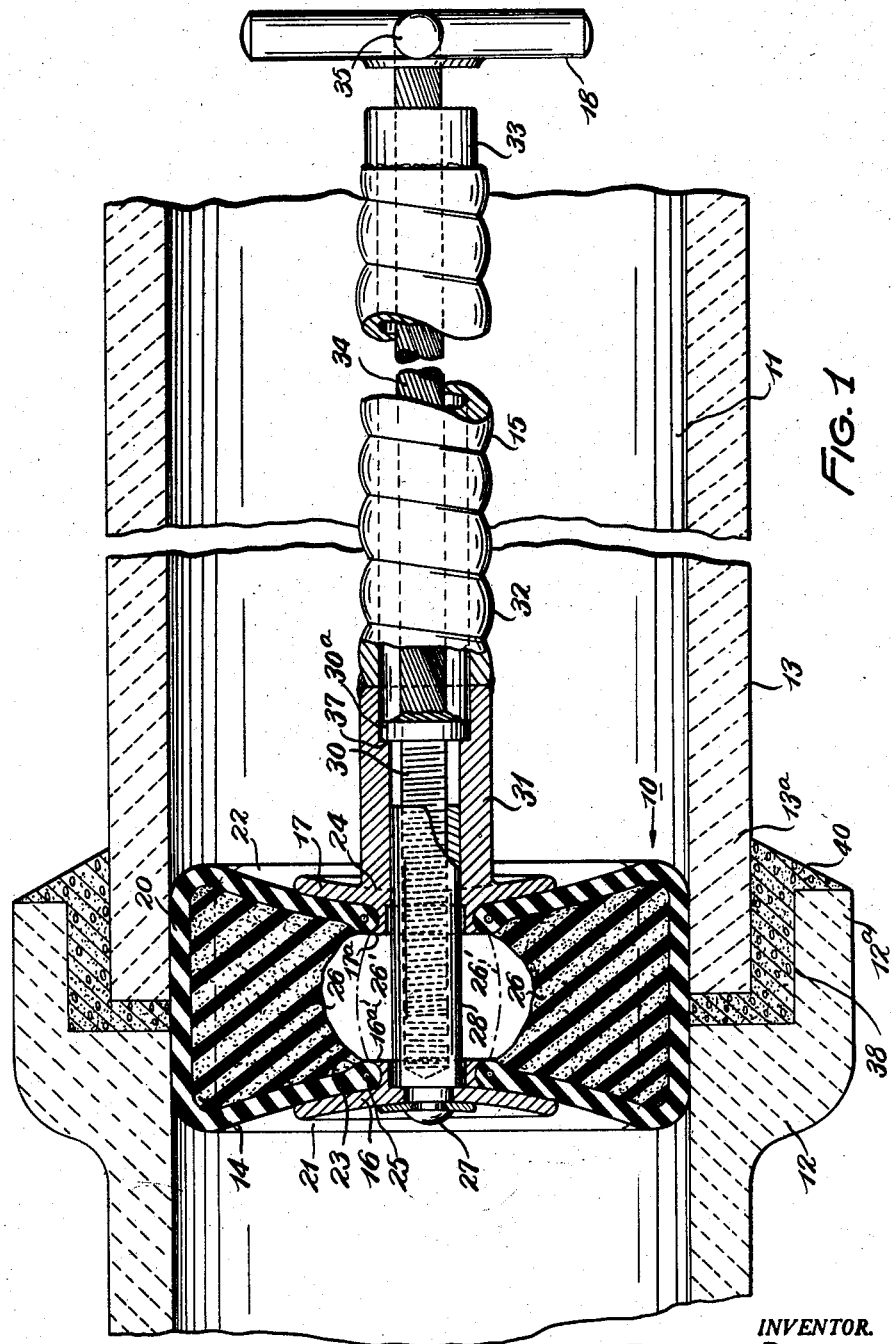

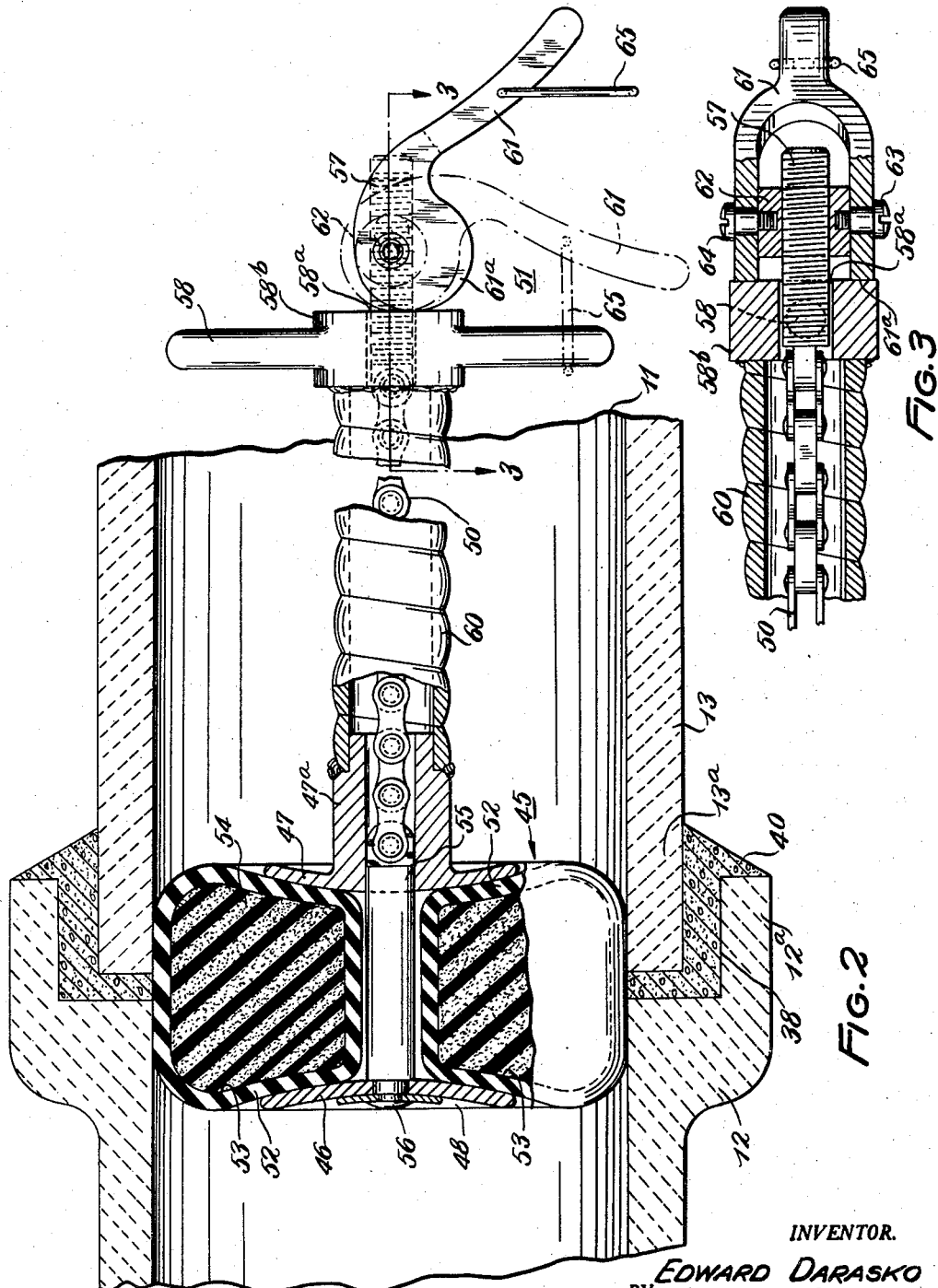

2,853,773

PIPE JOINT ALIGNER AND WIPER

Edward Darasko, Parma, Ohio

Application November 23, 1955, Serial No. 548,609

5 Claims. (Cl. 29—287)

This invention relates to pipe joint aligning and wiping devices and, more particularly, to a device of this kind which is expandable by deformation while the device is in use.

It is an object of this invention to provide a highly practical form of such an aligning and wiping device without resorting to pump means for expanding the device.

Another object of this invention is to provide an expandable device for use in a pipe passage comprising a flexible deformable casing having flexible stem means for movement of the device into and out of a pipe passage and for controllably causing the expansion and contraction of the casing.

It is a further object of this invention to provide an expandable device of the aforementioned character having a flexible deformable casing confining a flowable material so as to be responsive to pressure applied to the casing to distend the latter for use of a portion thereof as an aligning and wiping surface.

Still another object is to provide a deformable device of the kind above indicated in which screw means is employed for applying and relieving the deforming pressure effective on the flexible casing.

As another of its objects this invention provides a deformable device of the kind above referred to in which the stem means includes an outer flexible hollow stem portion and an inner handle-controlled flexible shaft for actuating the screw means, and in which the screw means is effective on the casing through a pair of relatively movable plate members.

Still a further object of this invention is to provide an expandable device of the above character wherein the deformable casing is in the general shape of a hollow annular member or hollow doughnut to confine the flowable material within same.

Yet another object of this invention is to provide an expandable device having a flexible deformable casing wherein flexible chain or link means are utilized to controllably distend the casing.

A further object is to provide an expandable device of the latter mentioned type having a deformable casing wherein handle means including cam means are operable for tightening the link means and in which the tightened link means is effective on the casing through a pair of relatively movable plate members.

The invention can be further briefly summarized as consisting in certain novel combinations and arrangements of parts hereinafter described, and particularly set out in the claims hereof.

In the drawings forming a part of this specification Fig. 1 is a longitudinal section, partially in elevation, taken through a pipe joint aligning and wiping device constructed according to this invention and showing the device in use in an expanded condition in a pipe passage;

Fig. 2 is a longitudinal section, partially in elevation, taken through a modified pipe joint aligning and wiping device embodying the invention and showing the device in use in a partially contracted condition in a pipe passage; and Fig. 3 is a transverse section, partially in elevation, taken along the line 3—3 of Fig. 2.

As one practical embodiment of this invention, Fig. 1 shows a pipe joint aligning and wiping device 10, which is insertable into a pipe passage 11 defined by pipe members or tiles 12 and 13 having cooperating bell and spigot ends 12$^a$ and 13$^a$. The aligning and wiping device 10 comprises, in general, a deformable casing and stem means 15 operatively connected with the casing for manipulation thereof. The device 10 also comprises pressure plates 16 and 17 between which the casing 14 is disposed with an outer portion of the casing projecting therefrom. The stem means 15 is a compound flexible stem means and is connected with the casing 14 through the plates 16 and 17 as is further described hereinafter.

The casing 14 comprises a deformable and distensible hollow annular member made of flexible sheet material such as rubber, molded plastic or the like. The casing 14 has a substantially cylindrical outer wall 20 whose end portions define radially extending annular end walls 21 and 22 which are confined by the plates 16 and 17. The inner annular edge portions of the end walls 21 and 22 of the casing 14 define annular beads 23 and 24 which are similar to the beads on the inner edges of the side walls of a pneumatic tire casing and having suitable reinforcing cables or the like, 25, therein. The annular beads 23 and 24 abut inwardly extending annular shoulders 16$^a$ and 17$^a$ provided on the plates 16 and 17, respectively, such that the casing 14 is carried by the plates.

Within the area of the casing 14 which is defined by the inner end walls 21 and 22, a flowable elastic material 26 such as sponge rubber, polyethylene, or other resilient plastics, and even air, is confined to substantially fill up the area enclosed thereby. The flowable material 26 utilized to fill up this area should have sufficient body so as to be responsive to pressure for filling out the cavities resulting from the transverse compressive deformation of the casing 14.

The plates 16 and 17 are located on substantially opposite sides of the casing 14 and in substantial axial alignment for exerting a compressive or squeezing force on the casing in response to relative movement between the plates. The plate 16 is fixed by securing means 27, in the form of a rivet or the like, to a tubular member 28 extending through the plate 17 and substantially centrally of the casing 14. The tubular member 28 is internally threaded to engage a cooperating threaded member 30 for actuating the plates 16 and 17, as will be presently described. The tubular member 28 extends into a suitably apertured stub shaft 31 provided on the free end of the plate 17 and integral therewith. The shaft 31 also receives the threaded member 30 from the opposite end thereof.

The stem means 15 and the handle member 18 constitute a means for manipulating the wiping device 10, that is, a means for inserting the device into the pipe passage 11 and positioning the casing 14 in the location of the joint being formed between the cooperating pipe ends 12$^a$ and 13$^a$. The stem means 15 comprises a flexible hollow tube or sheath member 32 having its inner end connected, as by welding, to the stub shaft 31 of the plate 17. The relatively stationary bearing member 33 may be connected with the opposite or outer end of the sheath 32 in any convenient manner.

The handle member 18 is transversely connected to the end of a flexible shaft 34 and secured thereto by means of a pin 35. The flexible shaft 34 extends longitudinally within the stem means 15 and in axial alignment with the casing 14. The inner end of the flexible shaft 34 is connected as by being welded to the externally threaded member or rod 30. The threaded member 30 is provided with a flanged portion 30ᵃ at the welded end thereof and adapted to abut a shoulder 37 provided adjacent the outer end of the stub shaft 31, by increasing the diameter of the axial aperture, to thereby allow the flanged portion 30ᵃ to freely pass therein. When the flanged portion 30ᵃ bears against the shoulder 37 a thrust applied thereto resulting from rotation of the handle member 18 will cause the member 30 to be threaded into the tubular member 28 to result in a relative movement or a change of spacing between the plates 16 and 17 to effect the compression of the casing 14.

When the aligning and wiping device 10 is to be used the casing 14 is located in covering relation to the joint 38 being formed between the cooperating pipe ends 12ᵃ and 13ᵃ. While the casing 14 is maintained in this position by a holding force applied to the sheath 32 and/or the handle member 18, the handle member 18 is rotated for causing the compressive force to be exerted on the casing by the plates 16 and 17. The flowable medium 26 is thus caused to fill out the outer peripheral cavities formed by the transverse expansion of the casing 14 in response to this external pressure.

The distended casing 14 also forms a retaining wall for the joint 38 for confining therein the cementitious material 40 which is introduced into the joint for connecting and sealing the pipe ends. Upon completion of the sealing of the pipe ends the aligning and wiping device 10 may be contracted by rotating the handle member 18 in the opposite direction thereby allowing the casing 14 to revert to its normal shape and force the flowable medium 26 to assume a shape substantially as indicated by the dotted lines 26'.

Now referring to Figs. 2 and 3, a modified pipe joint aligning and wiping device 45 will be described. The aligning device 45 is generally similar to the previously described embodiment except that the casing 48 is hermetically sealed and the pressure plates 46 and 47 are operative to compress or squeeze the flexible casing through the action of flexible or link means 50 operable through handle means 51 which includes a cam means.

The hollow annular or doughnut casing 48 is axially confined between the pressure plates 46 and 47 as in the previously described embodiment 10. The walls 52 of casing 48 define hollows 53 for receiving the flowable and elastic material 54 which is shown as completely filling up the hollows 53. The casing material for the flexible casing 48 may be rubber, molded plastic or any other suitable medium as hereinabove described. Similarly, the flowable material 54 may be sponge rubber, resilient plastic or the like.

The pressure plate 46 is connected to a coupling member 55 for engaging the link means 50. The plate 46 is fixed to coupling member 55 by securing means 56, such as a rivet, for example. The plate 47 is provided with a hollow shaft portion 47ᵃ for receiving the coupling member 55 which is slidable therein and also for receiving one end of the link means 50. The link means 50 is shown as being a chain and with one end of the chain being connected to the coupling member 55 to actuate the plate 46.

The free end of the link means 50 is connected to the reduced end portion of a threaded member 57. The link means 50 and the threaded member 57 are slidable through an axial aperture 58ᵃ provided in a transverse handle member 58 associated with the handle means 51. The link means 50 is enclosed through the provision of a sheath member 60 connected to the shaft portion 47ᵃ, as by being welded, and to the portion 58ᵇ of the handle member 58, which latter portion is constructed to provide a bearing surface for the handle means 51.

The handle means 51 also includes a cam handle or toggle arm 61 which is operative to tighten or tension the linking means 50 to cause the relative movement between the plates 46 and 47. The handle member 61 is bifurcated to receive the threaded member 57 in the opening thus defined by the forks thereof and is secured to a pivot pin 62. The pivot pin 62 is secured to the handle member 61 by the securing members 63 and 64 threaded into the thus connected members. The pivot pin 62 is axially apertured to be threaded onto the threaded member 57, as best seen in Fig. 3. Accordingly, the tension or link means 50 may be readily adjusted by rotating the handle member 61 which causes the rotation of the pivot pin 62 towards or away from the handle member 58.

The handle member 61 is constructed to define a cam portion 61ᵃ abutting the bearing portion 58ᵇ of the handle member 58 and cooperating therewith. The cam portion 61ᵃ is defined to allow the linking means 50 to be free or loose when the handle member 61 is in its outermost position, substantially as shown in Fig. 2. The cam portion 61ᵃ is further defined so that when the handle member 61 is rotated or swung towards the handle member 58 the high portion of the cam 61ᵃ will exert a pressure on the handle member 58 which is effective to pull the threaded member 57 towards the right hand side and thereby the plate 46 towards the right hand side as shown. A clip member 65 spaced from the outer end of the handle member 61 may be provided to secure the handle 61 in its innermost position, as shown in dotted outline in Fig. 2, to allow the operator to be free to cement the joint 38.

From the above description the operation of the aligning device 45 should be readily apparent, however, the operation will now be briefly summarized. Upon placing the aligning device 45 in its correct position at the joint 38 the handle member 61 is moved towards the handle 58 to thereby cause the relative movement between the plates 46 and 47 to effect the deformation of the casing 48. The flowable material 54 confined within the doughnut-like casing 48 being responsive to the pressure thus exerted will cause the cavities formed to be distended to provide the desired aligning and wiping surface. The aligning device 45 may be contracted to its normal position by moving the handle member 61 away from the handle member 58, and thereby release the compressive force applied to the casing 48. The contracted aligning device 45 may then be readily removed from the tile members 12 and 13.

By reason of the flexible character of the stem means provided for the aligning and wiping device of this invention, the device can be used in curved portions of pipe passages as well as in straight portions. Although the novel device of this invention has been referred to herein as a pipe joint aligning and wiping device, it should be understood that this device is also useable as a plunger or stopper in any accessible portion of a pipe passage in which the use of a plunger or stopper is needed.

From the accompanying drawing and the foregoing detailed description it will now be readily understood that this invention provides a pipe joint aligning and wiping device which is of very simple, durable, and inexpensive construction and which is expandable in the pipe passage by deformation to provide an aligning and wiping surface without resorting to inflation means. It will now also be seen that this invention provides a deformable pipe joint aligning and wiping device having a flexible deformable casing filled out by a flowable material responsive to pressure applied to the outer walls of the casing and adapted to be actuated by shaft means extending through or along a stem means projecting from such casing for causing the expansion and contraction of the latter. The stem means is effective to distend the casing through the provision of screw means or chain means to actuate a pair of compressive plates.

Although this novel pipe joint aligning and wiping device has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a plug type pipe joint tool, a pair of spaced plates, aligning means for said plates comprising a rigid hollow shaft connected with one of said plates and a rigid second shaft connected with the outer of said plates and substantially coaxially slidable in said hollow shaft, a flexible annular casing disposed between said plates and surrounding said second shaft, said casing being deformable by said plates in response to relative axial closing movement between the plates for pressing the peripheral portion of the casing against the wall of the pipe, flexible coaxial outer and inner stem members connected respectively with said hollow shaft and said second shaft, said stem members being relatively movable and effective on said shafts for causing said relative closing movement of said plates, handle means connected with said inner stem member and adapted to be manually actuated for producing the relative movement between said stem members, and sponge type flowable filler medium in said casing for distending the same, said outer and inner stem members together forming a compound flexible stem means for movement of the tool into and along a pipe joint.

2. In a plug type pipe joint tool, a pair of spaced plates, aligning means for said plates comprising a rigid hollow shaft connected with one of said plates and a rigid second shaft connected with the other of said plates and substantially coaxially slidable in said hollow shaft, a flexible annular casing disposed between said plates and surrounding said second shaft, said casing being deformable by said plates in response to relative axial closing movement between the plates for pressing the peripheral portion of the casing against the wall of the pipe, sponge type flowable filler medium in said casing for distending the same, a flexible but substantially axially solid hollow stem connected with said hollow shaft, a chain extending axially within said hollow stem and having its inner end connected to said second shaft, and manually operable means effective between the outer ends of said hollow stem and chain for applying a pulling force to the latter to produce the relative closing movement of said plates, said hollow stem and chain together forming a compound flexible stem means for movement of the tool into and along a pipe joint.

3. In a plug type pipe joint tool, a pair of spaced plates, aligning means for said plates comprising a rigid hollow shaft connected with one of said plates and a rigid second shaft connected with the other of said plates and substantially coaxially slidable in said hollow shaft, a flexible annular casing disposed between said plates and surrounding said second shaft, said casing being deformable by said plates in response to relative axial closing movement between the plates for pressing the peripheral portion of the casing against the wall of the pipe, a flexible but substantially axially solid hollow stem connected with said hollow shaft for manipulating and positioning the tool in a pipe joint, a chain extending axially within said hollow stem and having its inner end connected to said second shaft, manually operable means effective between the outer ends of said hollow stem and chain for applying a pulling force to the latter to produce the relative closing movement of said plates, the last-mentioned means comprising a swingable cam lever pivotally connected with said outer end of said chain and having a cam portion engageable with said outer end of said hollow stem.

4. In a plug type pipe joint tool, a pair of spaced plates, aligning means for said plates comprising a rigid hollow shaft connected with one of said plates and a rigid second shaft connected with the other of said plates and substantially coaxially slidable in said hollow shaft, a flexible annular casing disposed between said plates and surrounding said second shaft, said casing being deformable by said plates in response to relative axial closing movement between the plates for pressing the peripheral portion of the casing against the wall of the pipe, a flexible but substantially axially solid hollow stem connected with said hollow shaft for manipulating and positioning the tool in a pipe joint, a chain extending axially within said hollow stem and having its inner end connected to said second shaft, manually operable means effective between the outer ends of said hollow stem and chain for applying a pulling force to the latter to produce the relative closing movement of said plates, the last-mentioned means comprising a threaded stem connected with the outer end of said chain and carrying a rotatable nut, and a swingable lever fulcrumed on said nut and having a cam portion engageable with said outer end of said hollow stem.

5. In a plug type pipe joint tool, a pair of spaced plates, aligning means for said plates comprising a rigid hollow shaft connected with one of said plates and a rigid second shaft connected with the other of said plates and substantially coaxially slidable in said hollow shaft, a flexible annular casing disposed between said plates and surrounding said second shaft, said casing being deformable by said plates in response to relative axial closing movement between the plates for pressing the peripheral portion of the casing against the wall of the pipe, a flexible but substantially axially solid hollow stem connected with said hollow shaft for manipulating and positioning the tool in a pipe joint, a chain extending axially within said hollow stem and having its inner end connected to said second shaft, manually operable means effective between the outer ends of said hollow stem and chain for applying a pulling force to the latter to produce the relative closing movement of said plates, the last-mentioned means comprising a swingable cam lever pivotally connected with said outer end of said chain and having a cam portion engageable with said outer end of said hollow stem, and sponge type flowable filler medium in said casing for distending the same.

References Cited in the file of this patent

UNITED STATES PATENTS

| 491,184 | McCartney | Feb. 7, 1893 |
| 1,710,439 | Taylor | Apr. 23, 1929 |
| 1,893,979 | Barrere | Jan. 10, 1933 |
| 1,980,419 | Martin et al. | Nov. 13, 1934 |
| 2,177,916 | Thomas et al. | Oct. 31, 1939 |
| 2,315,538 | Moeller | Apr. 6, 1943 |
| 2,519,661 | Johnson | Aug. 22, 1950 |
| 2,550,672 | Chyba | May 1, 1951 |
| 2,615,414 | Adams et al. | Oct. 28, 1952 |
| 2,668,511 | Eberle et al. | Feb. 9, 1954 |

FOREIGN PATENTS

| 366,261 | Great Britain | Feb. 4, 1932 |